(12) United States Patent
Soffer

(10) Patent No.: US 8,988,532 B2
(45) Date of Patent: Mar. 24, 2015

(54) SECURE VIDEO CAMERA DEVICE

(75) Inventor: Aviv Soffer, Caesarea (IL)

(73) Assignee: High Sec Labs Ltd., Yokneam Industrial Zone (IL)

(\*) Notice: Subject to any disclaimer, the term of this patent is extended or adjusted under 35 U.S.C. 154(b) by 386 days.

(21) Appl. No.: 13/408,255

(22) Filed: Feb. 29, 2012

(65) Prior Publication Data

US 2013/0222609 A1     Aug. 29, 2013

(51) Int. Cl.
*H04N 5/225*     (2006.01)
*G03B 11/04*     (2006.01)
*G03B 17/18*     (2006.01)
*G06F 1/16*     (2006.01)
*H04N 5/232*     (2006.01)

(52) U.S. Cl.
CPC .............. *H04N 5/232* (2013.01); *G03B 11/043* (2013.01); *G03B 17/18* (2013.01); *G06F 1/1605* (2013.01); *H04N 5/2252* (2013.01)
USPC ........................................................ 348/207.1

(58) Field of Classification Search
USPC ....................................................... 348/207.1
See application file for complete search history.

(56) References Cited

U.S. PATENT DOCUMENTS

| | | | | |
|---|---|---|---|---|
| 5,949,474 A | * | 9/1999 | Gerszberg et al. | 348/14.01 |
| 7,548,255 B2 | * | 6/2009 | Bear et al. | 348/207.11 |
| 8,612,788 B2 | * | 12/2013 | Hsieh | 713/324 |
| 2002/0064388 A1 | * | 5/2002 | Takahashi | 396/484 |
| 2005/0085252 A1 | * | 4/2005 | Reyes | 455/519 |
| 2009/0080878 A1 | | 3/2009 | Cirker | |
| 2009/0256917 A1 | * | 10/2009 | Lin et al. | 348/207.11 |
| 2010/0177487 A1 | * | 7/2010 | Arshad et al. | 361/737 |
| 2012/0148227 A1 | | 6/2012 | Schmit et al. | |
| 2012/0154662 A1 | * | 6/2012 | Yang | 348/333.02 |
| 2012/0327294 A1 | * | 12/2012 | Jaffrain et al. | 348/366 |
| 2013/0088611 A1 | * | 4/2013 | Ueda et al. | 348/211.99 |

\* cited by examiner

*Primary Examiner* — Anthony J Daniels
(74) *Attorney, Agent, or Firm* — Browdy and Neimark, PLLC

(57) ABSTRACT

A secure video camera device for reducing the risk of visual and audio eavesdropping has a video camera and an electro-mechanical shutter behind a transparent cover in a secured enclosure. The shutter optically obscures the camera lens when the device is in secure state. A visual indicator indicates when the device is in operational state. A switch controllable by the user, select the state of the device by concurrently disabling the camera turning off the visual indicator in a secure state; and setting said device in an operational state by concurrently enabling the camera and turning on said lighted indicator. The device has a built in, or auxiliary microphone, and audio outputs which are disabled in secure state of the device. The device is tempered proof by an anti-tempering circuitry.

14 Claims, 3 Drawing Sheets

SECURE VIDEO CAMERA DEVICE

FIELD OF THE INVENTION

The present invention relates to a device and a method that enables a computer user to securely use video interaction and communication devices such as web video camera or internal video camera without being exposed to the risk of remote audio/video eaves dropping.

BACKGROUND OF THE INVENTION

The presence of video cameras and microphones in computerized products such as desktop computers, laptop computers, PDAs, tablets and mobile phones creates an information security and privacy protection challenge today. As computers connected to public networks and to the internet can be easily hacked and controlled remotely, these products having internal or external video cameras and microphones are at risk of becoming an eavesdropping device. Attacker can easily install a malicious code on the product that will activate the video camera and microphone to get real-time video and audio surveillance of the surrounding environment. Video and audio stream received from the video camera is then compressed and the resulted data is streamed over the internet to the interested attacker. Then the attacker reconstructs the video and audio signal, enhance it if needed and analyze it to recover valuable information. Such method can operate while the user is completely unaware and it can even run undetectable by anti-virus and intrusion detection programs through the use of Zero Day Vulnerabilities. Zero Day Vulnerabilities are non-publicized new security vulnerabilities that can be used by attackers to modify or control product functionality.

One of the most common methods used to hack computer video cameras and microphones remotely is through the use of RAT. RAT is an acronym for Remote Access Trojan. A RAT might have a functional use, but it is typically used to describe malicious code that is installed without the user's knowledge with the intent of monitoring the computer, logging keystrokes, capturing passwords and otherwise assuming control of the computer from a remote location. Common RATs such as Sub7 have the functionality of enabling computer microphone or video camera remotely and streaming the data back to the attacker.

Prior-art computer video cameras are prone to covert eavesdropping as they are typically not equipped with efficient means of properly disabling camera activity when not used by the user. Even when a mechanical shutter and On-Off switch is installed in the camera, such switch is not efficient as users tend to leave it on continuously.

Computer video camera devices are also lacking the clear user indications when camera and microphone are active and therefore users are unaware when the camera and microphone are being activated by software means.

Another disadvantage of prior-art computer video cameras is the lack of anti-tampering means that will prevent physical attack on the device in attempt to bypass switches or other internal security means.

To overcome these disadvantages, many high-security organizations are instructing their workforce to remove all video cameras from their desktop computers. In addition to that, many organizations are physically removing internal video cameras and microphones from the laptop computers that they are purchasing and using.

Cisco TelePresence PrecisionHD USB Camera data-sheet (document number C78-628611) discloses a video camera having a mechanical shutter controllable by the user that couples with enable-disable switch and LED indicator. This product is a Tandberg Telecom AS product that is also covered by US Patent application 2010/0134635 A1.

While mechanical shutter offers some security and privacy protection, it fails to provide stronger level of protection needed for high security organizations as user may leave the camera on and the shutter open for unlimited time.

US Patent application 2011/0058255 A1 discloses yet another simple solution for video camera security and privacy—a mechanical lens cover that may be manually positioned by the user. This method lacks the mechanism to prevent users from leaving the shutter in open position and therefore it is unsecure.

U.S. Pat. No. 5,949,474 discloses a videophone device having a video camera with lens cover and warning light. The disclosed device is fundamentally different from the computer video camera device and method of the current invention. Further the implementation claimed in this patent does not provide adequate protection level as the user may leave the shutter open indefinitely.

SUMMARY OF THE EMBODIMENTS

In view of the security risks associated with video camera connected to computers, and in view of the shortcoming of prior art video cameras connected to computers, there is a need for a secure computer video camera device that as least will:
1. Provide efficient and secure switching of the camera and microphone activity, controllable only by the user and completely isolated from computer control;
2. Prevent inadvertent long periods of active camera and microphone by user neglect or lack of discipline; and
3. Provide clear user visual indications when camera and microphone are active.

It is an one aspect of the current invention to provide a secure video camera device comprising: a video camera having a camera lens and a sensor coupled to electrical interface; at least one visual indicator located near said lens, capable of providing visual user indication when said camera is active; a computer interface cable connecting the secure device to a coupled computer; a processor board interfacing with the said computer interface cable with said video camera sensor, capable of: driving said sensor, receiving and processing sensor video stream; and; a switch controllable by the user, and capable of: setting said device in a secured state by concurrently: disabling said video camera sensor; and turning off said visual indicator; and setting said device in an operational state by concurrently: enabling transfer of video data from said video camera sensor to said processor board; and turning on said lighted indicator.

In some embodiments the device further comprises an electromechanical shutter located in front of said camera lens and actuated by said switch such that: setting said device in a secured state causes said shutter to obscure said lens; and setting said device in an operational state causes said shutter to clear the view of said lens.

In some embodiments disabling said video camera sensor comprises electrically disconnecting said sensor from said processor board.

In some embodiments the device further comprises a microphone coupled through said switch to said processor board to provide audio input, wherein said: setting said device in a secured state comprises disabling said microphone; and setting said device in an operational state comprises enabling said microphone.

In some embodiments disabling said microphone comprises electrically disconnecting said microphone from said processor board.

In some embodiments the device further comprises a security controller, controlling said switch; and a momentary switch operate by said user and connected to said security controller, wherein said momentary switch triggers said security controller to activate said operational state.

In some embodiments the security controller is operable in push-to-use mode such said operational state is activated when said momentary switch is pressed, and said security controller automatically sets said device in said secured state when said momentary switch is released.

In some embodiments the device further comprises security controller is operable in Timed mode such said operational state is activated when said momentary switch is pressed, and said security controller automatically sets said device in said secured state after predefined time duration to prevent inadvertent prolonged device activation.

In some embodiments the device is further capable of: providing user indication when said predefined time duration is about to end, and extending the time of activation of said operational state with additional predefined time duration by pressing again said momentary switch.

In some embodiments the predefined time duration is adjustable by the user.

In some embodiments the device further comprises a timer preventing inadvertent prolonged device activation when said momentary switch is inadvertently or advertently stayed pressed for prolonged time duration.

In some embodiments the momentary switch comprises an internal lighted element providing user indication when the device is in operational state, and when said predefined time duration is about to expire.

In some embodiments the device further comprises illumination intensity of said lighted indicator is automatically controlled by the ambient light sensor within a range of illumination levels.

In some embodiments the device further comprises an anti-tampering controller, capable of detecting mechanical intrusion attempt, and to permanently disable the device once such attempt is detected.

In some embodiments the device further comprises an internal power source for powering said active anti-tampering circuitry when the device is unpowered, wherein said power source is selected from a group consisting of: battery; and super-capacitor.

In some embodiments the device further comprises at least one auxiliary audio interface capable of being connected an external audio device selected from a group consisting of: a speaker; headset, microphone and an earphone, wherein said auxiliary audio interface is active when said device is in said operational state and disabled when said device is in said secured state.

In some embodiments the headset is connected to said device via a non standard connector having additional pins for security functions.

It is another aspect of the invention to provide a method for securing a computer video camera, the method comprises: a) connecting to a coupled computer a secure computer video camera device, said device comprising: a video camera having a camera lens and a sensor coupled to electrical interface; at least one visual indicator located near said lens, capable of providing visual user indication when said camera is active; a computer interface cable connecting the secure device to a coupled computer; a processor board interfacing with the said computer interface cable with said video camera sensor, capable of: driving said sensor, receiving and processing sensor video stream; and; a switch controllable by the user; and b) operating said switch controllable by the user to perform one of: setting said device in a secured state by concurrently: disabling said video camera sensor; and turning off said visual indicator; and setting said device in an operational state by concurrently: enabling transfer of video data from said video camera sensor to said processor board; and turning on said lighted indicator.

In some embodiments the secure computer video camera device comprises electromechanical shutter located in front of said camera lens and actuated by said switch such that said: setting said device in a secured state causes said shutter to obscure said lens; and setting said device in an operational state causes said shutter to clear the view of said lens.

In some embodiments the secure computer video camera device comprises a microphone coupled through said switch to said processor board to provide audio input, wherein said: setting said device in a secured state comprises disabling said microphone; and setting said device in an operational state comprises enabling said microphone.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
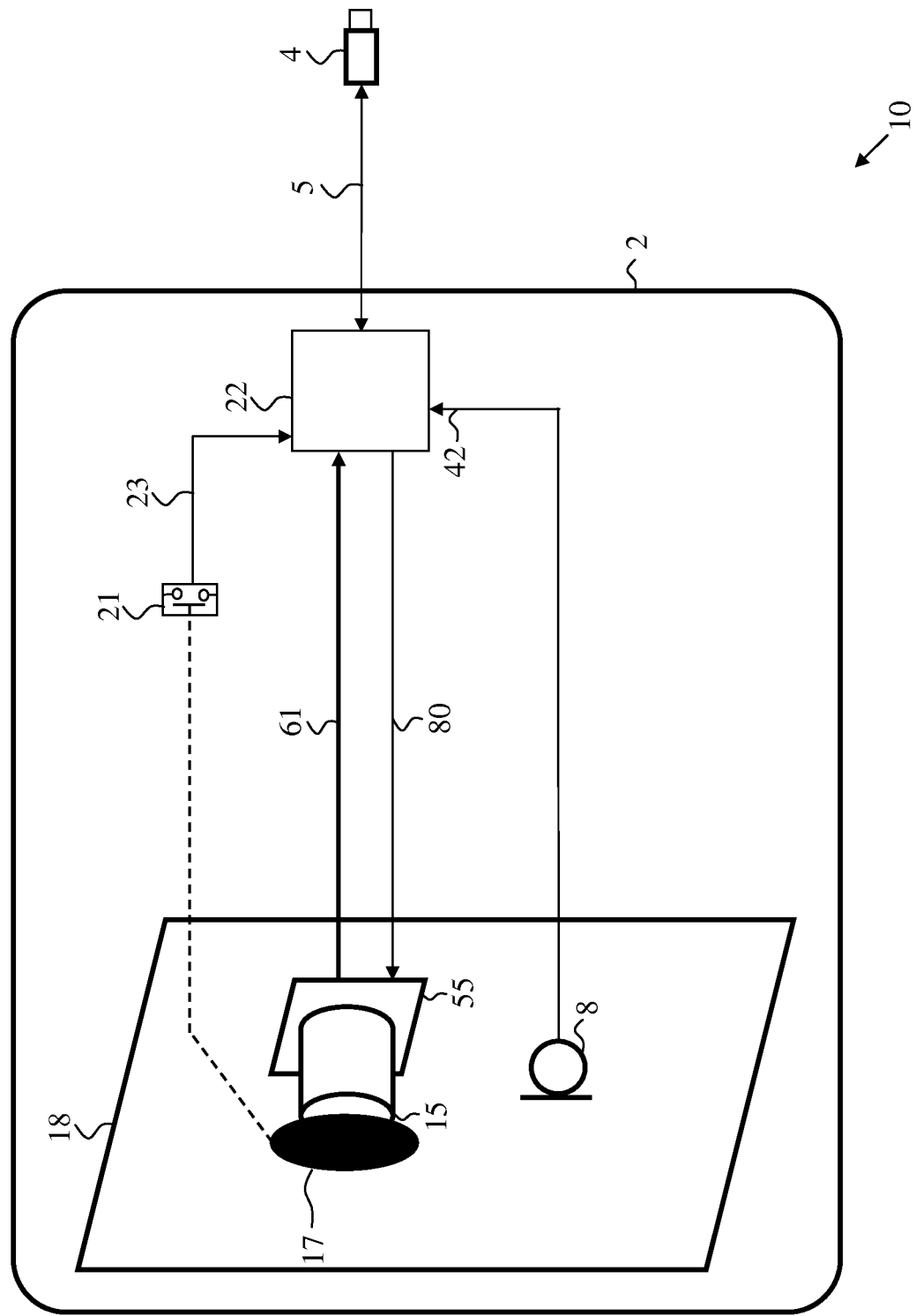
FIG. 1 illustrates a block-diagram of the typical prior-art computer add-on USB video camera with internal microphone and mechanical shutter.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as sub-routines in an operating system, may be functions in an installed software package, and the like.

FIG. 1 schematically illustrates a block-diagram of the typical prior-art computer add-on USB video camera 10. In this particular example of prior art device, the user may disable the camera using a mechanical shutter 17 that is located at the camera front panel 18 in front of the camera lens 15. Mechanical shutter is also linked to a switch 21 to disable the camera when the shutter is in the close position (obstructing the camera lens 15). Switch 21 is linked to the video camera processor board 22 through line 23. Microphone 8 located at the camera front panel 18 is also coupled to the camera processor board 22 through line 42.

Camera lens 15 is mechanically coupled to the camera sensor 55. Camera sensor 55 is typically a CMOS (Complementary metal-oxide-semiconductor) sensor or CCD (Charged Coupled Device) sensor. Power to the camera sensor 55 is provided by the camera processor board 22 through lines 80. Camera sensor video output signal is coupled to the camera processor board 22 through lines 61. The camera processor board communicates with the coupled computer (not seen in this figure for drawing clarity) through USB cable 5 and USB Type-A connector 4. Front panel 18 is attached to the camera enclosure 2 and is typically equipped with a mechanical base or a clip to enable simple installation on the user display or desk.

This prior-art camera is similar to Cisco/Tandberg PrecisionHD USB Video camera.

It should be noted here that most prior-art computer video cameras are lacking mechanical shutter 17 and therefore are always active when connected to the computer.

This prior-art computer video camera is lacking efficient camera sensor and microphone isolation switching, user indications and tampering detection means and therefore it is regarded as non-secure device. Users tend to leave this camera enabled.

In some prior-art products although the video camera sensor is off when the shutter is closed, the microphone can be activated by the software driver and therefore it may be used by attacker to hear the surrounding environment remotely.

Figure 2:
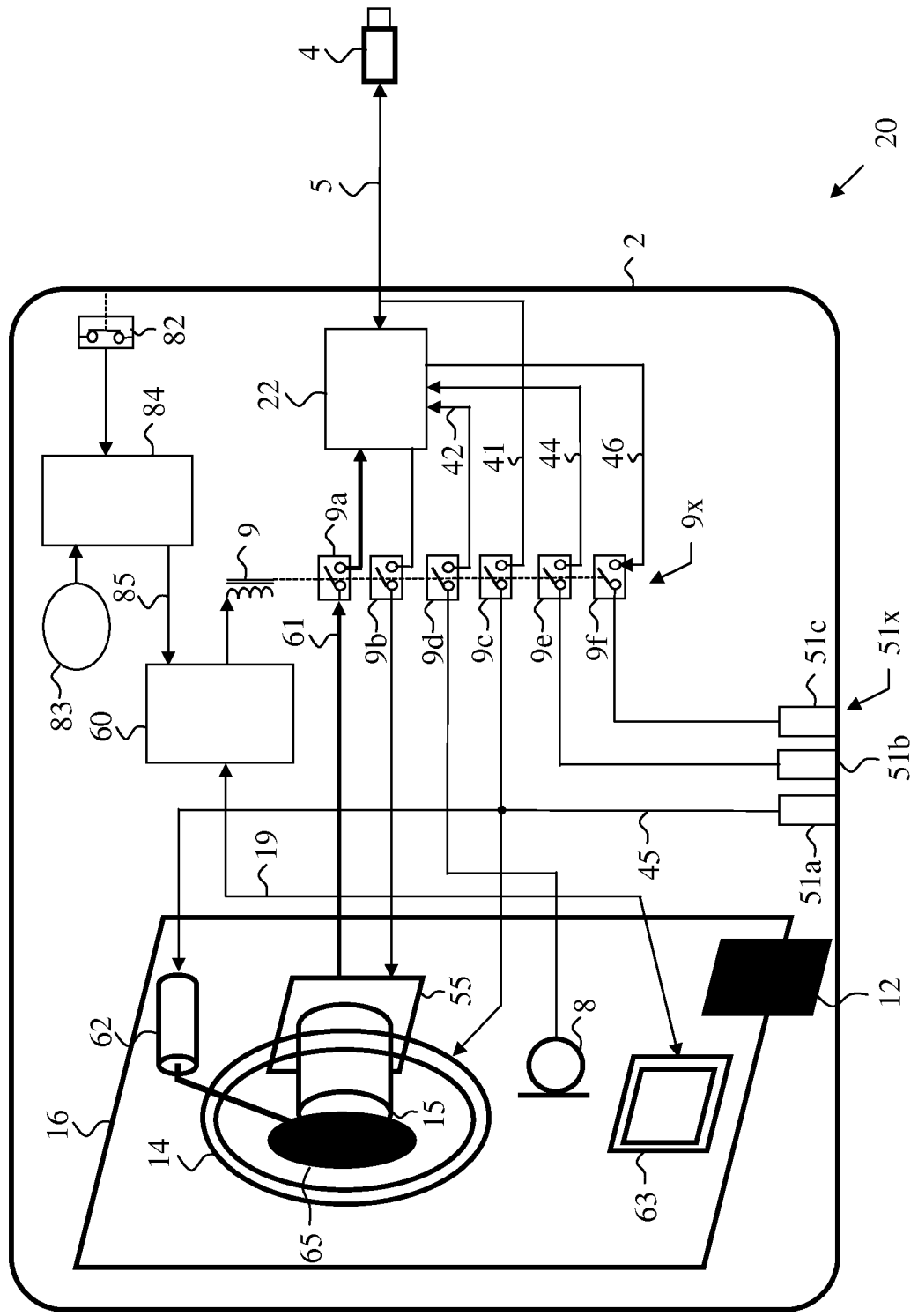
FIG. 2 illustrates a high-level block-diagram of a secure device having an electromechanical shutter, visible activity indication, secure camera and microphone isolation circuitry and active anti-tampering function, seen in non-active (secure) state, according to an exemplary embodiment of the current invention.

FIG. 2 illustrates a high-level block diagram of a secure computer video camera device 20 according to an exemplary embodiment of the current invention. Secure computer video camera 20 is having an electromechanical shutter 65 located in front of the camera lens 15 and actuated by solenoid or motor 62. When shutter 65 solenoid or motor 62 is powered—it is moves the shutter 65 to the side to unhide the camera lens 15. When the shutter 65 solenoid or motor 62 is unpowered—it is returns the shutter 65 by a spring to the position that obscure the camera lens 15. This arrangement makes the shutter normally closed. Power to the shutter solenoid or motor 62 is derived by the security controller function 60 through switch 9c and switched lines 45. Preferably, shutter 65 is behind the front panel 16, which is transparent, at least at the area in front of lens 15 of the camera. Thus, a user or abuser cannot interfere or mechanically inhibit the closing of shutter 65.

Camera controller board 22 is a prior-art camera module having video front-end, video and audio CODECs, USB interface, power supplies and other circuitry needed to support a video sensor. Audio CODECs may be in a form of a CODEC chip or chips and may comprise a microphone mute input (not seen in this figure for drawing clarity) controlling the state of the CODEC function. Optionally, the mute input is controlled by a switch 9x, for example via an additional switch (not seen in this figure for drawing clarity) in the 9x switch, or via line 45 or from an output of security controller function 60. Camera controller board processors perform functions such as: image signal processing (ISP) and compression with various interfaces such as CPU type parallel, RS-232, 5-line serial interface, USB full/high speed device controller, and USB full speed host controller. Typical Camera controller boards have embedded microcontrollers with programmable memory to support system control and protocol layers.

The security controller function 60 is a microcontroller or any other control circuitry (for example an ASIC or a Programmable Gate Array or an FPGA, etc) that preferably is only responsible for the camera security functionality. It is typically implemented using ROM or locked-flash type microcontroller to prevent firmware tampering.

Figure 3:
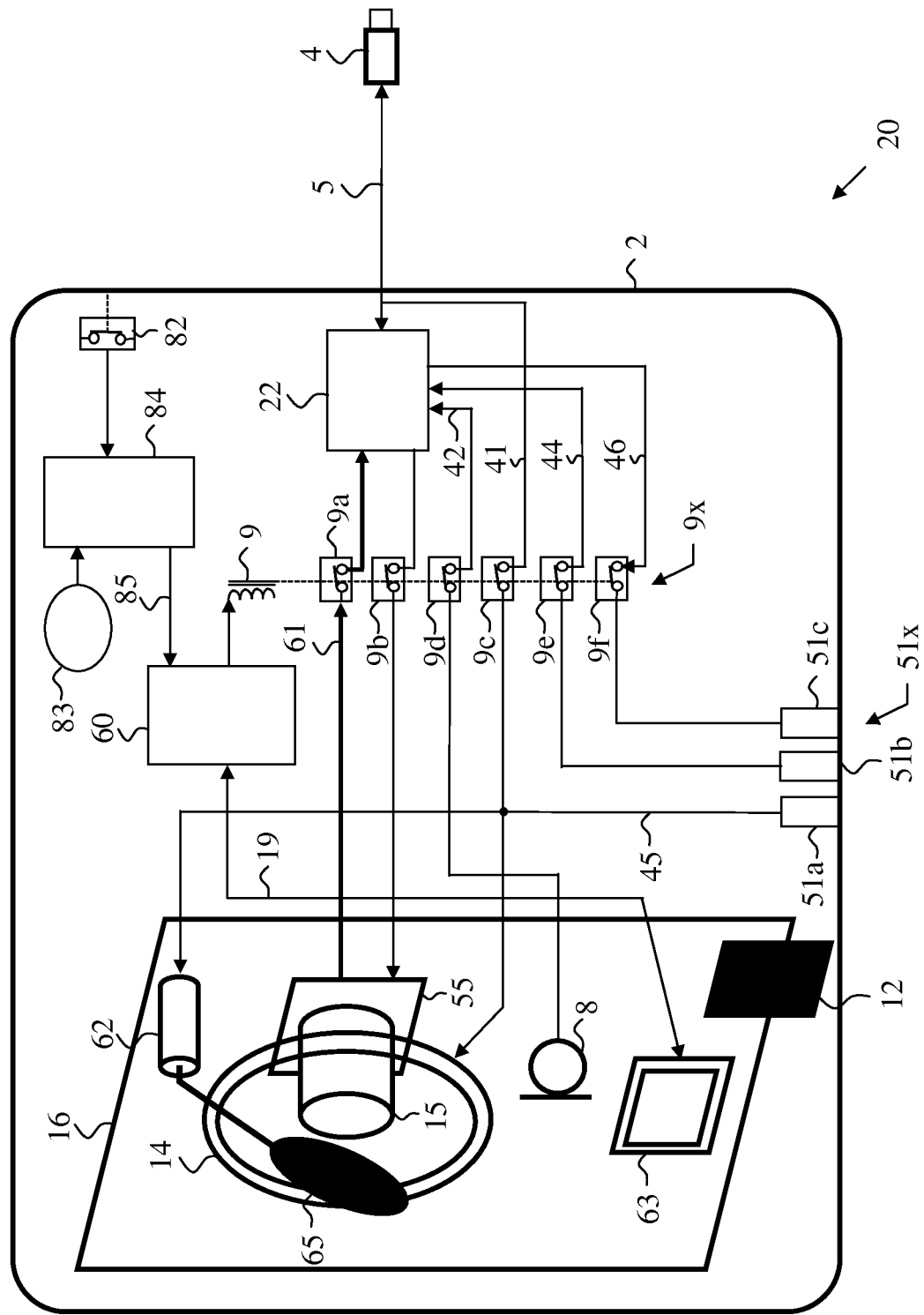
FIG. 3 illustrates a high-level block-diagram of the device illustrated in FIG. 2 in active (unsecure) state, according to an exemplary embodiment of the current invention.

Security control function 60 drives the main relay or switching function 9 and coupled switches 9a to 9f (together marked as 9x) that enables or disables the security function. When the relay or switching function is unpowered (as illustrated in this figure)—all switches are open. When the relay or switching function is powered (as illustrated in FIG. 3)—all switches are closed.

Lighted element 14 is a light emitting element, for example a single or an array of LEDs, or other light emitting element such as OLED preferably located on the camera front panel 16 of enclosure 2, around or near the camera lens 15 window. Lighted element 14 provides clear visual indications to the user when the camera and microphone are active. Switch 9c drives power to lines 45 from the USB interface power line 41 which is powered by the coupled computer via USB cable 5. When security control function powers switches 9x, switch 9c closes and supply power to lines 45 that provides power to:
1. The shutter 65 solenoid or motor 62,
2. The lighted element 14, and:
3. The optional connector 51a that may drive external secure accessories.

Microphone element 8 optionally attached to the front panel 16 is coupled to the processor board 22 audio input line 42 through switch 9d. If microphone element 8 requires bias or operating power source, then another switch 9x may be added to switch that power line as well. Switch 9d isolates the microphone 8 from the processor board 22 to prevent abuse by a malicious code when the user is unaware of. This arrangement assures that even if the controller board 22 is fully controlled by the remote attacker, access to the microphone input would not be possible.

Similarly the camera sensor 55 is coupled to the processor board 22 through lines 61 and switch 9a. Switch 9a may be a solid state high speed multiplexer, bus switch or similar electrical isolation device capable of handling high speed lines or multiple channel switching. Optional switch 9b may isolate the camera sensor 55 from the power supplies in the processor board to add another security mechanism. In this figure as switch 9 is unpowered, camera sensor 55 is isolated from the processor board 22 (both power and data output). Camera sensor 55 preferably comprising of Image array, amplifier, fast Analog to Digital function, Gain Control, Image Processor function, Image output interface function with LVDS. An example for such sensor is Omni-Chip's OVT12825.

Processor board 22 may also support an optional audio input 44 for auxiliary microphone plugged into the aux microphone jack 51b and switched through switch 9e.

Processor board 22 may further support an optional audio output 46 for auxiliary headphones or speakers plugged into the aux headphone jack 51c and switched through switch 9f.

Push-button switch 63 attached to the device 20 enclosure 2 or to the front panel 16 enables user activation of the camera when needed. Push-button switch 63 is preferably a momentary switch, preferably having a visual indicator such as bi-color LED illumination. Once the button is pushed, the security controller function 60 get the signal through line 19 and starts activating the camera through relay or switches 9x. Concurrently, the visual indicator changes to indicate that the device is in active mode, for example by emitting green light.

Camera activation may be implemented by one or few of preprogrammed scheme such as:
1. Press and Hold—Camera is active only when push-button 63 is being pressed (and hold).
2. Timed—Camera is active for a predefined time interval after push-button 63 released. Time interval may be fixed, or user selectable through means such as DIP Switches or selector switch. Once timer is nearing the end of activation time, for example reaching last 20% of time, the push button internal green color illumination starts blinking. If the user pushes the button 63 again, camera will stay on for one more additional time interval. If the user does not push the push-button 63 again—camera will be disabled once the time interval was ended. Concurrently, the visual indicator changes to indicate that the device is in disabled mode for example by turning off the indicator.
3. Sensed—Additional schemes may be defined with sensors such as IR proximity sensor (not shown in this figure) to detect the user and keep the camera active as long as the user is in front of the camera or audio level detection scheme that detects a minimum level of audio input to extend the camera delay.
4. Voice Activated Switching (VOX)—Optionally, a microcontroller in security controller function 60 may be programmed to perform other switching functions such as: Voice Activated Switching (VOX) that holds the relay 9x if voice level exceeds a certain level or other programmed functions as required for particular use. For example VOX function may hold the microphone enabled after switch 63 was presses for as long as the user is talking, and disables the microphone if the user is not talking for a preset (dwell) time. Optionally a directional microphone is used so that ambient noise is less effective on the VOX function. Optionally VOX function has preset maximum activation duration.

Manual or automatic lighting intensity control may be added to provide device lighting intensity adaptation to the surrounding ambient light level. An ambient light sensor may be coupled to the security controller function to provide an input to automatic adjustment algorithm that dims the lighted element 14 and push-button 63 internal LEDs.

Enclosure 2 of device 20 is designed to prevent attempts to penetrate the enclosure 2 in order to gain access to the internal circuitry. Tampering sensor 82 coupled to key fasteners or features of enclosure 2, senses any attempt to open the enclosure 2. Once sensor 82 is triggered, the coupled anti-tampering controller 84 triggers a chain of irreversible processes. If the device 20 is powered, the anti-tampering controller 84 communicating with the security controller function 60 through lines 85 and as a response the security controller function 60 performs the following:
1. Disable the camera activity through releasing (disabling) relay or switches 9x.
2. Illuminate red color LEDs inside push-button 63 to warn the user that the camera was tampered.

These actions are preferably irreversible—security controller function 60 is permanently changed to prevent a tampering attempt that will return the modified device to normal service.

Coin battery or super-capacitor 83 provides backup power to the anti-tampering controller 84 to enable tampering detection while the camera 20 is unpowered or disconnected from host computer.

Additional tampering prevention means such as Holographic Tampering Evident Label 12 may be added on the camera enclosure 2 and front panel 16 to provide additional user indications in case of mechanical intrusion attempt.

FIG. 3 illustrates a high-level block-diagram of the same exemplary method and embodiment of the present invention illustrated in FIG. 2 above.

In this figure the device is in active (unsecure) state. In this state, relay or switch 9x is powered by security controller function 60 and therefore it closes all 6 switches 9a-f, performing the following:

Switch 9a couples the video camera sensor 55 video output lines 61 to the processor board 22;
Switch 9b couples the power lines from processor board 22 to the video camera sensor 55;
Switch 9c couples USB supplied power to drive the lighted element 14 and the shutter 65 solenoid or motor 62 driving shutter 65 out of the camera lens 15. It also driving the power to the auxiliary optional device jack 51a. As switch 9c is closed in this figure, power is supplied to all resources connected to line 45;
Switch 9d couples the microphone audio output to the processor board 22 audio input 42; and:
Switches 9e and 9f couples the processor board 22 audio input 44 and audio output 46 to the optional auxiliary audio device jacks 51b and 51c respectively.

It may be useful to use the microphone mute function of the Audio CODEC chip since if one disconnects the microphone (e.g. using switches 9d and/or 9e), and the Audio CODEC chip on board 22 is not aware of that fact, the computer, OS and applications remain unaware that the microphone is muted. It may be preferred that the driver in the coupled computer will become aware of the microphone status, so the user may be notified, for example by an "on screen massage, that his audio input is needed but unavailable. Since the mute input is preferably physically shutting down the A/D inside the Audio CODEC it provides an optional additional layer of protection to prevent microphone activation.

It should be noted that jacks 51a, 51b, and 51c (together marked as 51x) may be replaced by a single connector having sufficient number of connector's contacts, such as 6 or more contacts. Jacks 51x may be replaced by and uncommon or proprietary connector such that it cannot be used with a common headset, or a combination of common microphone and earphones/speaker, thus reducing the possibility of abusing the system. Optionally, the headset is permanently connected to the device or connected to the device via a non standard connector having additional pins for security functions.

In some optional embodiments, common audio inputs and optionally outputs are disabled, physically removed, plugged, jammed or missing such that no common microphones, earphones, headsets or speakers may be used with the computer.

Additionally, or optionally, the device 20 may comprise an authentication or verification function known in the art. Such authentication or verification function may be in the form that allows the computer to interrogate the USB functions in the device 20 and verify that the connected device is a "trusted device". In some embodiments, tempering with the device may optionally disable its authentication or verification function.

In some optional embodiments, a timer (for example, but not limited to a timer implemented within security controller function 60) may sense the length of time that momentary switch 63 is pressed. If momentary switch 63 is pressed for a long duration, it may indicate a jamming of the switch, or a mechanical force forcing the switch. In such case, corrective action may be taken automatically, such as immediate transition to a secured state, and/or temporarily or permanently disabling of the device. In some optional embodiments, the computer may keep a log of the times that the device 20 was active and this log may be manually or automatically scanned for signs of potential abuse such as frequent or long durations of audio activity.

In some optional embodiments the activation duration of device 20 in response to each pressing of the momentary switch 63 may be programmed. Programming may be done at manufacturing for example by programming firmware within the tempered-proof enclosure 2 of device 20. Alternatively, DIP Switches or jumpers within the tempered-proof enclosure 2 of device 20 may be used.

Alternatively, optionally or additionally, a dial, DIP switches or other switch located on the outside of the device may be used for adjusting the microphone activation duration in response to each pressing of the momentary switch. In this case, the time duration is preferably adjusted with a limited range such as 5 sec to 5 minutes.

In some optional embodiments time durations of VOX dwell time and maximum time are factory and/or field adjustable as disclosed above. In some optional embodiments the mode of operation: Push and Hold, Timed, Sensed, and/or VOX may be are factory and/or field adjustable as disclosed above.

In some optional embodiments, light intensity of indicator light 14 is controlled to match the requirements of being visibly noticeable, but not overly illuminating when operated in a dark room or at night. Illumination level may be controlled by the user using a dimmer, or automatically by ambient light sensor. However, optionally or preferably, illumination level may be adjusted within a predefined range of illumination levels to prevent setting the illumination to unnoticeable low level.

In some optional embodiments, device 20 is designed to be used only with a headset such that microphone 8 is missing. Optionally, connector 51x is also missing and the headset is permanently connected to the device.

In some embodiments the light source 14 is blinking to enhance the awareness of the user to the fact that the microphone is active.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A secure video camera device comprising:
a video camera having a camera lens and a sensor coupled to an electrical interface;
at least one visual indicator located near said camera lens, capable of providing visual user indication when said video camera is active;
a computer interface cable of connecting the secure device to a coupled computer;
a processor board interfacing with the said computer interface cable with said video camera sensor, capable of: driving said sensor, receiving and processing sensor video stream; and;
a switch controllable by the user, and capable of:
setting said device in a secure state by concurrently:
disabling said video camera sensor; and
turning off said at least one visual indicator; and
setting said device in an operational state by concurrently:
enabling transfer of video data from said video camera sensor to said processor board; and
turning on said lighted indicator;
a security controller, controlling said switch; and
a momentary switch operated by said user and connected to said security controller, wherein said momentary switch triggers said security controller to activate said operational state wherein said security controller is operable in timed mode such that said operational state is activated when said momentary switch is pressed, and said security controller automatically sets the device in the secure state after predefined time duration to prevent inadvertent prolonged device activation and wherein said momentary switch comprises an internal lighted element providing user indication when the device is in operational state, and when said predefined time duration is about to expire.

2. The device of claim 1, and further comprising electro-mechanical shutter located in front of said camera lens and actuated by said switch such that said:
setting said device in a secure state causes said shutter to obscure said camera lens; and
setting said device in an operational state causes said shutter to clear the view of said camera lens.

3. The device of claim 1, wherein said disabling said video camera sensor comprises electrically disconnecting said sensor from said processor board.

4. The device of claim 1, and further comprising a microphone coupled through said switch to said processor board to provide audio input, wherein said:
setting said device in a secure state comprises disabling said microphone; and
setting said device in an operational state comprises enabling said microphone.

5. The device of claim 4, wherein said disabling said microphone comprises electrically disconnecting said microphone from said processor board.

6. The device of claim 1, wherein said security controller is operable in push-to-use mode such that said operational state is activated when said momentary switch is pressed, and said security controller automatically sets said device in said secure state when said momentary switch is released.

7. The device of claim 1, wherein the device is further capable of:
providing user indication when said predefined time duration is about to end, and
extending the time of activation of said operational state with additional predefined time duration by pressing again said momentary switch.

8. The device of claim 1, wherein said predefined time duration is adjustable by the user.

9. The device of claim 1, and further comprising a timer preventing inadvertent prolonged device activation when said momentary switch is inadvertently or advertently stayed pressed for prolonged time duration.

10. The device of claim 1, wherein illumination intensity of said lighted indicator is automatically controlled by the ambient light sensor within a range of illumination levels.

11. The device of claim 1, wherein the device further comprises an anti-tampering controller, capable of detecting mechanical intrusion attempt, and to permanently disable the device once such attempt is detected.

12. The device of claim 11, and further comprising an internal power source for powering said active anti-tampering circuitry when the device is unpowered, wherein said power source is selected from a group consisting of: battery; and super-capacitor.

13. The device of claim 1, and further comprising at least one auxiliary audio interface capable of being connected to an external audio device selected from a group consisting of: a speaker; headset, microphone and an earphone, wherein said auxiliary audio interface is active when said device is in said operational state and disabled when said device is in said secure state.

14. The device of claim 13, wherein said headset is connected to said device via a non standard connector having additional pins for security functions.

* * * * *